(12) United States Patent
Spesser et al.

(10) Patent No.: US 10,500,967 B2
(45) Date of Patent: Dec. 10, 2019

(54) ELECTRICAL CHARGING APPARATUS, ELECTRICAL CHARGING STATION AND METHOD FOR CONTROLLING AN ELECTRICAL CHARGING APPARATUS

(71) Applicant: Dr. Ing. h.c. F. Porsche Aktiengesellschaft, Stuttgart (DE)

(72) Inventors: Daniel Spesser, Illingen (DE); Thomas Krauss, Reutlingen (DE); Dirk Herke, Kirchheim unter Teck (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 179 days.

(21) Appl. No.: 15/006,158

(22) Filed: Jan. 26, 2016

(65) Prior Publication Data

US 2016/0214499 A1    Jul. 28, 2016

(30) Foreign Application Priority Data

Jan. 26, 2015   (DE) ......................... 10 2015 101 041

(51) Int. Cl.
*B60L 11/18*     (2006.01)
(52) U.S. Cl.
CPC ................. *B60L 11/1846* (2013.01)
(58) Field of Classification Search
CPC ...... H02J 7/0004; H02J 7/0003; H02J 7/0006; H02J 7/0011; H02J 7/0027;
(Continued)

(56) References Cited

U.S. PATENT DOCUMENTS 9,126,489 B2 * 9/2015 Herzog ............... B60L 11/1818
2010/0174667 A1 * 7/2010 Vitale .................. B60L 3/0069
705/412

(Continued)

FOREIGN PATENT DOCUMENTS

DE    10 2011 084 216    4/2013
DE    10 2011 056 501    6/2013
(Continued)

OTHER PUBLICATIONS

German Search Report dated Oct. 6, 2015.

*Primary Examiner* — Drew A Dunn
*Assistant Examiner* — Sailesh Thapa
(74) *Attorney, Agent, or Firm* — Gerald E. Hespos; Michael J. Porco; Matthew T. Hespos

(57) ABSTRACT

An electrical charging apparatus (10) for charging an electrical energy store of a motor vehicle (12) has an electrical connection (16) to electrically connect the charging apparatus (10) to a charging station (14) and to interchange electrical energy with the charging station (14). An electrical converter (18) is connected to the electrical connection (16) to interchange the electrical energy with the charging station (14) via the electrical connection (16) and to convert the electrical energy. A control unit (20) is connected to the electrical converter (18) to control the interchange of the electrical energy. A communication interface (22) is assigned to the control unit (20) and is designed to interchange data (34) with the charging station (14). The control unit (20) is designed to control the interchange of the electrical energy on the basis of the data.

7 Claims, 1 Drawing Sheet

(58) Field of Classification Search
CPC ............. B60L 2230/34; B60L 2230/00; B60L 11/1838; Y02T 90/166; Y02T 90/165; Y02T 90/164; Y02T 90/125
See application file for complete search history.

(56) References Cited

U.S. PATENT DOCUMENTS

| | | | |
|---|---|---|---|
| 2013/0154667 A1 | 6/2013 | Scheu et al. | |
| 2013/0207455 A1* | 8/2013 | Doljack | H02J 7/0036 307/9.1 |
| 2013/0241484 A1* | 9/2013 | Kiko | B60L 3/0069 320/109 |
| 2013/0271075 A1* | 10/2013 | Restrepo | H02J 7/0042 320/109 |
| 2013/0311017 A1 | 11/2013 | Matsunaga et al. | |
| 2014/0021917 A1 | 1/2014 | Paupert | |
| 2014/0042967 A1 | 2/2014 | Herzog | |
| 2015/0375627 A1* | 12/2015 | Weber | B60L 11/1846 320/109 |
| 2016/0036259 A1* | 2/2016 | Cheatham, III | H02J 7/0004 320/103 |
| 2016/0325632 A1* | 11/2016 | Ichikawa | B60L 11/005 |

FOREIGN PATENT DOCUMENTS

| | | | | |
|---|---|---|---|---|
| DE | 10 2012 221 473 | | 5/2014 | |
| KR | 20130047905 | * | 5/2009 | |
| WO | 2012/128626 | | 9/2012 | |
| WO | WO-2012128626 A2 * | | 9/2012 | ............. B60L 3/003 |
| WO | WO-2013000599 A1 * | | 1/2013 | .......... B60L 11/1816 |

\* cited by examiner

ELECTRICAL CHARGING APPARATUS, ELECTRICAL CHARGING STATION AND METHOD FOR CONTROLLING AN ELECTRICAL CHARGING APPARATUS

CROSS REFERENCE TO RELATED APPLICATION

This application claims priority under 35 USC 119 to German Patent Appl. No. 10 2015 101 041.0 filed on Jan. 26, 2015, the entire disclosure of which is incorporated herein by reference.

BACKGROUND

1. Field of the Invention

The invention relates to an electrical charging apparatus for charging an electrical energy store of a motor vehicle. The charging apparatus has an electrical connection to connect the charging apparatus electrically to a charging station and to interchange energy with the charging station, an electrical converter that is connected to the electrical connection for interchanging electrical energy with the charging station via the electrical connection and to convert the electrical energy, and a control unit that is connected to the electrical converter to control the interchange of the electrical energy.

2. Description of the Related Art

The invention also relates to an electrical charging station for charging electrical energy stores of motor vehicles. The charging station has an electrical connection to connect the charging station electrically to a mobile charging apparatus and to interchange electrical energy with the charging apparatus. The charging station also has a communication interface for interchanging data with the charging apparatus.

The invention also relates to a charging unit having an electrical charging station and an electrical charging apparatus.

The invention further relates to a method for controlling an electrical charging apparatus. The method includes the steps of connecting an electrical converter to a charging station and interchanging electrical energy between the charging station and the electrical converter by controlling the electrical converter by a control unit.

The charging apparatus, the charging station and the method are used to supply mobile electrical devices, in particular electrical motor vehicles, with electrical energy and to interchange electrical energy between the charging station and the charging apparatus and to control the interchange of the electrical energy.

Known electrically driven motor vehicles and known charging stations are configured to connect the charging apparatus of the motor vehicle electrically to the stationary or public power supply network to charge the electrical energy stores of the motor vehicles. Electrical energy can be transmitted to the electrical energy store of the motor vehicle in either a single-phase or three-phase manner depending on the electrical connection or availability. A transformer converts electrical energy that is transmitted from the stationary public power supply network from alternating current into direct current. As a result, a phase shift occurs between the electrical current and the electrical voltage and accordingly reactive power is transmitted. Furthermore, network asymmetries or a neutral point shift may occur during single-phase transmission of electrical energy to the energy store of the motor vehicle. Excessively high electrical reactive powers that occur when charging motor vehicle or individual phases that have an excessive load, may result in disconnection of the electrical energy transmission.

US 2014/0021917 A1 controls a charging station for motor vehicles by assigning a control unit to each three-phase electrical connection to control the three-phase transmission of electrical energy as symmetrically as possible and hence to avoid asymmetries and neutral point shifts. However, reactive power can still occur and simple single-phase energy transmission is not possible, for example in private households.

An object of the invention is to provide an improved electrical charging apparatus, an improved electrical charging station and an improved method for controlling an electrical charging apparatus, thus enabling reliable and robust electrical energy transmission.

SUMMARY

The invention relates to charging apparatus with a control unit with a communication interface that is designed to interchange data with the charging station. The control unit is designed to control the interchange of the electrical energy on the basis of the data. The invention also relates to a charging station with such a communication interface to interchange data for controlling the interchange of electrical energy with the charging apparatus. The invention further relates to a method for controlling an electrical charging apparatus. The method includes interchanging data between the charging apparatus and the charging station and controlling the electrical converter on the basis of the interchanged data to achieve a controlled interchange of electrical energy between the charging apparatus and the charging station.

Data are interchanged between the charging station and the charging apparatus and the interchanged data are used to control the interchange of electrical energy between the charging station and the charging apparatus. Thus, the withdrawal of electrical energy by the charging apparatus can be controlled or limited from the charging station to prevent high reactive powers, neutral point shifts or asymmetrical network loads, and hence to avoid disconnection of the electrical energy transmission. As a result, electrical energy is transmitted in a reliable and robust manner to motor vehicles.

The electrical connection may have plural phases to interchange the electrical energy with the charging station in a multi-phase manner. The control unit may independently control the interchange of the electrical energy in the phases on the basis of the interchanged data. Thus, one-sided loading of a phase is avoided or an existing zero point shift is corrected for achieving a symmetrical network load.

The data interchanged with the charging station may have information relating to the maximum amount of electrical energy in the individual phases. Thus, the amount of electrical energy in individual phases can be limited deliberately to avoid an asymmetrical network load.

The control unit and the electrical converter may be connected to the electrical connection via a first electrical line. As a result, electrical energy can be interchanged between the electrical converter and the electrical connection with a small amount of technical effort. The control unit also may be connected to the electrical converter via a second electrical line. As a result, the control unit can control the electrical converter with a small amount of technical effort and can control the amount of energy or the energy interchange with the charging station.

The communication interface may be connected to the control unit via the first electrical line. As a result, the electrical line that is used to transmit the electrical energy can be used as a line for transmitting the data, thus making it possible to reduce the technical effort for setting up the data channel.

The control unit may be arranged in the electrical line between the electrical converter and the electrical connection, and the control unit may be a control and protection unit (ICCPD). As a result, the control unit can control the transmission of electrical energy and simultaneously can form reliable protection from overvoltage with a small amount of technical effort.

The communication interface may form a bidirectional interface for bidirectional data interchange. As a result, different data can be interchanged between the charging station and the charging apparatus. The interchanged data may contain the network load, the number of phases under load, information relating to a state of a transformer in the electrical network, information for specifying a phase load, feedback relating to instantaneous phase use of the electrical converter, power calculation, predictions with regard to an expected power drain and authentication data for authenticating the charging apparatus or for authenticating the motor vehicle.

An amount of the electrical energy is limited on the basis of the data. This makes it possible to avoid overloading as a result of the withdrawal of energy or loading of the charging station and the connected electrical network.

An amount of the electrical energy in individual electrical phases between the charging station and the charging apparatus may be set or limited on the basis of the interchanged data. This makes it possible to avoid an asymmetrical network load or to deliberately compensate for an existing asymmetrical network load.

Authentication data for authenticating the charging apparatus may be transmitted from the charging apparatus to the charging station. This makes it possible to identify the charging apparatus or an owner of the charging apparatus and to pay for electrical energy withdrawn from public charging stations.

Overloading of the electrical network or an asymmetrical load on the electrical network can be avoided by transmitting the data and controlling the withdrawal of electrical energy on the basis of the transmitted data since the withdrawal of electrical energy by the charging apparatus can be controlled by the charging station in a demand-oriented manner. Thus, an existing asymmetrical load can be compensated for or can be avoided from the outset. Thus, disconnection of the electrical energy supply at the charging station due to an asymmetrical load or withdrawal of reactive power is avoided, thereby supplying electrical energy at the charging station in a more reliable manner.

Exemplary embodiments of the invention are illustrated in the drawings and are explained in more detail in the following description. The features mentioned above and those explained below can be used in the stated combinations and in other combinations or alone without departing from the scope of the invention.

DETAILED DESCRIPTION

Figure 1:
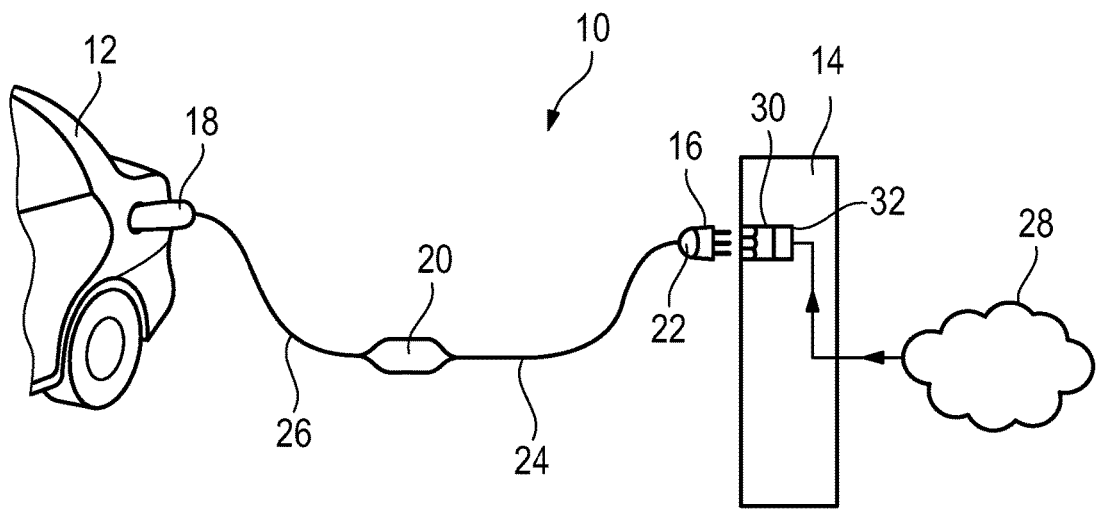
FIG. 1 is a schematic illustration of an electrically driven motor vehicle that is connected to a charging station for charging an energy store.

A charging apparatus is illustrated schematically in FIG. 1 and is denoted generally by 10. The charging apparatus 10 connects a motor vehicle 12 to a charging station 14 to charge an electrical energy store of the motor vehicle 12 at the charging station 14.

The charging apparatus 10 generally has an electrical connection 16 or a connector 16 to connect the charging apparatus 10 electrically to the charging station 14 and to transmit electrical energy to the charging apparatus 10 or to the electrical energy store of the motor vehicle 12. The charging apparatus 10 has an electrical converter 18 that usually converts alternating current into direct current by a transformer to charge the electrical energy store of the motor vehicle 12 using direct current. The charging apparatus 10 also has a control unit 20 to control the electrical converter 18 and to control or set the withdrawal of electrical energy from the charging station 14. The charging apparatus 10 also has a communication interface 22 that interchanges data between the control unit 20 and the charging station 14. The control unit 20 is designed to control or limit the electrical energy withdrawn from the charging station 14 by the converter 18.

The electrical connector 16 is connected to the control unit 20 via a first electrical line 24 having a plurality of wires, and the control unit 20 is connected to the converter 18 via a second electrical line 26 having a plurality of wires. The first electrical line 24 is used to transmit the data from the communication interface 22 to the control unit 20, and the wires of the first electrical line 24 also are used to transmit the electrical energy. Thus, the first electrical line 24 forms a data channel or a PLC channel that is bidirectional so that data can be transmitted from the control unit 20 to the charging station 14 and from the charging station 14 to the control unit 20. The second electrical line 26 is used to transmit the electrical energy and also is used to transmit the data to the converter 18 or to the motor vehicle 12 so that the second electrical line 26 also forms a bidirectional data channel or a PLC channel.

Electrical energy can be transmitted from the charging station 14 to the motor vehicle 12 in a three-phase manner or in a single-phase manner depending on availability.

The conversion of alternating current into direct current by means of the converter 18, which preferably is a transformer, usually results in a phase shift between the electrical current and the electrical voltage. As a result, electrical reactive power is withdrawn from the charging station 14 or the public network to which the charging station 14 is connected. Furthermore, one-sided phase loads or asymmetrical network loads and zero point shifts may occur during single-phase energy transmission or in the case of a large number of vehicles 12 connected to the charging station 14. In the extreme situation, transmission of the electrical energy to the motor vehicles 12 must be disconnected. The communication interface 22 receives data from the charging station and defines information relating to the maximum possible withdrawal of energy or the maximum possible reactive power or the maximum possible withdrawal of reactive current. As a result, the control unit 20 controls the converter 18 and the withdrawal of energy can be adapted in accordance with the specifications by the charging station 14. Hence, it is possible to limit the withdrawal over individual phases, or individual phases can be loaded more greatly in the event of an existing asymmetrical network load so that the asymmetry of the load can be compensated for. The charging station 14 can thereby control the withdrawal of energy by the individual charging apparatuses by transmitting the data to the communication interface 22 of the charging apparatus 10 to achieve symmetrical withdrawal of energy with power factor correction.

As shown in FIG. 1, the control unit 20 is integrated in the electrical line of the charging apparatus 10 and accordingly forms an integrated control unit and an overvoltage protection device (ICCPD) in the electrical line.

The charging station 14 is connected to the electrical network and preferably to the public power supply network 28 and obtains the electrical energy transmitted to the charging apparatus 10 from the public power supply network 28. The charging station 14 accordingly has an electrical connection 30 for connecting the electrical connection 16 of the charging apparatus 10 and also has a communication interface 32 that is connected to the electrical connection 30 to interchange the data with the communication interface 22 of the charging apparatus 16. As a result, the charging station 14 can transmit the electrical energy to the charging apparatus 10 and can interchange the data with the communication interface 22 of the charging apparatus 10 for controlling the energy consumption of the charging apparatus 10.

Figure 2:
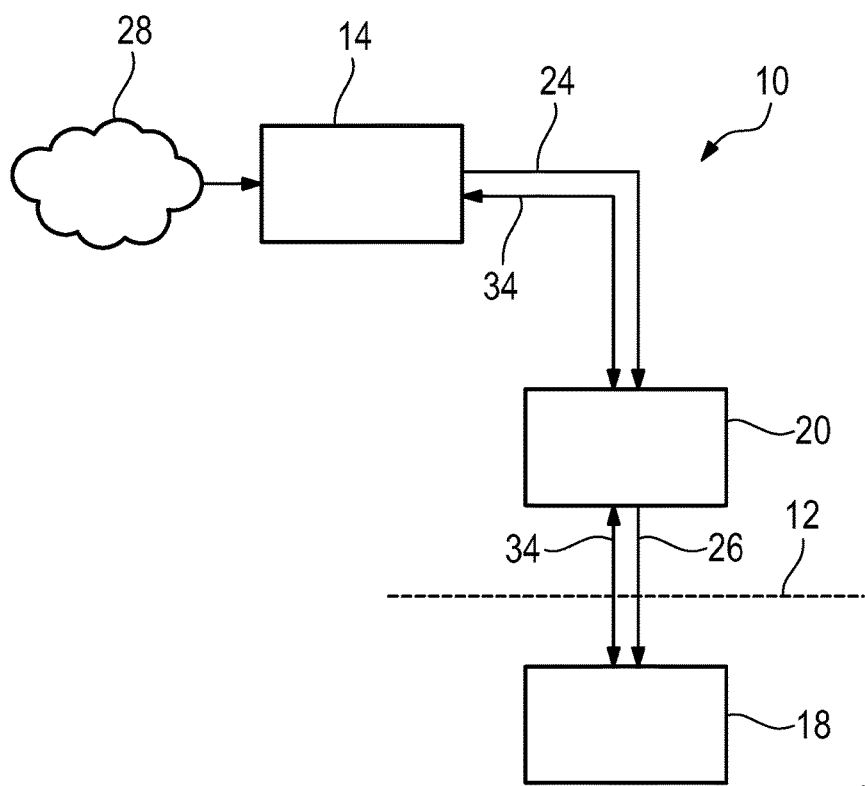
FIG. 2 is a schematic illustration of interchange of data and electrical energy between a charging apparatus and a charging station.

FIG. 2 illustrates a schematic view of the transmission of energy and data between the charging apparatus and the charging station. The same elements are denoted with the same reference numerals, only the special features being explained here.

The charging station 14 is connected electrically to the public network 28 to withdraw electrical energy from the network 28 and to make it available to the charging apparatus 10. The electrical energy is transmitted from the charging station 14 to the control unit 20 by the first electrical line 24, the data 34 simultaneously being interchanged between the charging station 14 and the control unit 20. In this case, the electrical line for electrical energy transmission simultaneously forms a bidirectional PLC channel. The control unit 20 also is connected electrically to the converter 18 that is inside the motor vehicle 12 in this illustration. The control unit 20 controls the converter 18 on the basis of the data 34. Thus, the converter 18 receives the electrical energy according to the specifications from the charging station or consumes the electrical energy from the charging station 14. The electrical connection between the control unit 20 and the converter 18 is used to transmit the electrical energy simultaneously forms the bidirectional PLC channel. Therefore, the control unit 20 can interchange the data 34 and control data with the converter 18 and the motor vehicle 12 at the same time.

The data 34 may preferably contain information relating to the network load for phases under load or phase numbers under load, information relating to transformer states in the public network 28, specifications for the phase load, feedback relating to instantaneous phase uses by the charging apparatus 10, power calculation for determining the reactive power and predictions of future power drains. Furthermore, the data 34 which are transmitted from the control unit 20 to the charging station 14 may also have authentication data for authenticating the charging apparatus 10 or the motor vehicle 12.

Overall, the charging apparatus 10 and the charging station 14 can be used to implement a controlled power drain, with the result that the electrical energy can be reliably provided and the likelihood of the energy supply being disconnected is minimized.

What is claimed is:

1. An electrical charging apparatus for charging an electrical energy store of a motor vehicle, comprising:
   an electrical connector configured to removably connect the charging apparatus to a stationary charging station and configured to interchange electrical energy and data with the stationary charging station, wherein the electrical connector has a plurality of phases to interchange the electrical energy with the stationary charging station in a multi-phase manner;
   a communication interface electrically connected to the electrical connector;
   an electrical converter configured to be removably coupled to the electrical energy store of the motor vehicle and to convert the electrical energy from the stationary charging station from an alternating current (AC) voltage to a direct current (DC) voltage;
   an electrical line electrically connecting the communication interface to the electrical converter, the electrical line including a first electrical line and a second electrical line;
   the first electrical line including a first end and a second end, the first end of the first electrical line connected to the communication interface and the second end of the first electrical line connected to a control unit, the first electrical line forming a bidirectional powerline communication (PLC) channel between the communication interface and the control unit for transmitting data and electrical energy;
   the second electrical line including a first end and a second end, the first end of the second electrical line connected to the control unit and the second end of the second electrical line connected to the electrical converter, the second electrical line forming a bidirectional PLC channel between the control unit and the electrical converter for transmitting data and electrical energy;
   the control unit integrated in the electrical line and configured to form an overvoltage protection device; and
   the communication interface configured to interchange data between the stationary charging station and the control unit via the electrical connector and the first electrical line,
   wherein, the control unit is configured to independently control the interchange of the electrical energy in each of the phases between the stationary charging station and the charging apparatus via the electrical converter on the basis of the interchange data to prevent high reactive powers, zero point shifts, and asymmetrical network loads,
   wherein, in the event of an existing asymmetrical network load, the control unit is configured to limit the withdrawal of electrical energy over individual phases or load individual phases more greatly to avoid and/or compensate for the existing asymmetrical network load.

2. The electrical charging apparatus of claim 1, wherein the data interchanged with the stationary charging station have information relating to a maximum amount of electrical energy in the phases.

3. The electrical charging apparatus of claim 1, wherein the communication interface is connected to the electrical converter via the second electrical line.

4. The electrical charging apparatus of claim 1, wherein the communication interface forms a bidirectional interface for bidirectional data interchange.

5. The electrical charging apparatus of claim 1, wherein the electrical converter is positioned on the motor vehicle.

6. A method for controlling an electrical charging apparatus, comprising:
   removably connecting an electrical converter of the electrical charging apparatus to a charging station, wherein the electrical connector has a plurality of phases to interchange the electrical energy with the stationary charging station in a multi-phase manner;
   interchanging data between the electrical charging apparatus and the charging station using a line that transmits electrical energy from the charging station to the electrical charging apparatus;
   independently interchanging the electrical energy in the phases between the charging station and the electrical converter by controlling the electrical converter on the basis of the interchanged data; and
   providing a control unit integrated in the line between the electrical converter and the charging station, the control unit configured to form an overvoltage protection device and to control the electrical converter to independently control the interchange of electrical energy in each of the phases between the stationary charging station and the charging apparatus on the basis of the interchanged data to prevent high reactive powers, zero point shifts, and asymmetrical network loads,
   wherein, in the event of an existing asymmetrical network load, the control unit is configured to limit the withdrawal of electrical energy over individual phases or load individual phases more greatly to avoid and/or compensate for the existing asymmetrical network load.

7. The method of claim 6, further comprising transmitting authentication data from the charging apparatus to the charging station for authenticating the electrical charging apparatus.

* * * * *